Patented July 8, 1952

2,602,785

UNITED STATES PATENT OFFICE 2,602,785

COMPOSITIONS CONTAINING GLYCIDYL POLYETHERS OF DIHYDRIC PHENOLS AND POLYVINYL ACETATE

Quentin T. Wiles, Lafayette, and Daniel W. Elam, Berkeley, Calif., assignors to Shell Development Company, Emeryville, Calif., a corporation of Delaware No Drawing. Application September 30, 1950, Serial No. 187,817

11 Claims. (Cl. 260—30.4)

This invention relates to compositions of matter which, after addition thereto of a hardening agent, are particularly suited for use as adhesives, molding compositions, and potting compounds for electrical apparatus.

The essential ingredients of the usually liquid compositions of the invention are a glycidyl polyether of a dihydric phenol having a 1,2-epoxy equivalency greater than 1.0, and a minor proportion of a polyvinyl ester of a saturated fatty acid such as the acetate. Although incorporation of vinyl resins in general into compositions wherein the glycidyl polyether is principal resin-forming constituent results in the hardened compositions having adversely affected strength and adhesive properties, we have unexpectedly discovered that use of limited proportions of a polyvinyl ester of a saturated fatty acid, not only improves the strength of the cured resin, but also gives it great resistance to shock, a property of prime importance especially when the compositions are employed as adhesives for metal-to-metal bonding.

The material contained in the composition of the invention which is subject to cure is a glycidyl polyether of a dihydric phenol having a 1,2-epoxy equivalency of greater than 1.0. By the epoxy equivalency reference is made to the number of 1,2-epoxy groups

contained in the average molecule of the glycidyl ether. The glycidyl polyethers of dihydric phenols, owing to their method of preparation, are ordinarily a mixture of chemical compounds, which, although they are of similar identity and chemical constitution, have different molecular weights. The measured molecular weight of the mixture upon which the epoxy equivalency is dependent will necessarily be an average molecular weight. Consequently, the epoxy equivalency of the glycidyl ether mixture will not necessarily be the integer 2, but will be a value which is greater than 1.0. For example, a glycidyl polyether especially suitable for use in the invention is made by reacting 2,2 - bis(4 - hydroxyphenyl)propane with epichlorhydrin in alkaline solution in a mol ratio of about 2.6 mols of epichlorhydrin per mol of the dihydric phenol. The product is a mixture of glycidyl ethers having a measured average molecular weight of 469. Analysis shows the product to have an epoxy value of about 0.40 equivalents per 100 grams. Consequently, the product has an epoxy equivalency of about 1.9, i. e., an average of about 1.9 epoxy groups per molecule.

The 1,2-epoxide value of the glycidyl polyether is determined by heating a weighed sample of the ether with an excess of 0.2 N pyridinium chloride chloroform solution at the boiling point under reflux for 2 hours whereby the pyridinium chloride hydrochlorinates the epoxy groups to chlorhydrin groups. After cooling, the excess pyridinium chloride is back titrated with 0.1 N sodium hydroxide in methanol to the phenolphthalein end point. This method was used for obtaining all epoxide values discussed herein.

The glycidyl polyethers of the dihydric phenols used in the composition of the invention are prepared by reacting a dihydric phenol with epichlorhydrin in alkaline solution. For this purpose any of the various dihydric phenols are used, including mononuclear phenols like resorcinol, catechol, hydroquinone, etc., or polynucleur phenols like 2,2-bis(4-hydroxyphenol)propane (bisphenol), 4,4'-dihydroxybenzophenone, 1,1-bis(4-hydroxyphenyl)ethane, 1,1-bis(4-hydroxyphenyl)isobutane, 2,2 - bis(4 - hydroxyphenyl)butane, 2,2-bis(4-hydroxy-2-methylphenyl)propane, 2,2-bis(4-hydroxy - 2 - tertiarybutylphenyl)propane, bis(2-hydroxynaphthyl)methane, 1,5-dihydroxynaphthalene, etc.

The glycidyl polyether of the dihydric phenols are made by heating at 50° C. to 150° C. the dihydric phenol with epichlorhydrin, using one to two or more mols of epichlorhydrin per mol of the dihydric phenol. Also present is a base such as sodium, potassium, calcium, or barium hydroxide in amount of 10% to 30% stoichiometric excess of the epichlorhydrin—i. e., 1.1 to 1.3 equivalents of base per mol of epichlorhydrin. The heating is continued for several hours to convert the reactant to a taffy-like consistency whereupon the reaction product is washed with water until free of base. Although the product is a complex mixture of glycidyl ethers, the principal product may be represented by the formula

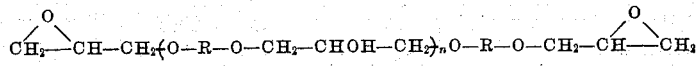

wherein R represents the divalent hydrocarbon radical of the dihydric phenol and $n$ is an integer of the series 0, 1, 2, 3, etc. The length of the chain can be made to vary by changing the molecular proportion of epichlorhydrin and dihydric phenol. Thus by decreasing the mols of epichlorhydrin per mol of dihydric alcohol from about 2 downwards toward 1.0, the molecular weight and the softening point of the resinous glycidyl ether is increased. In general, these glycidyl ethers, having an epoxy equivalency between 1.0 and 2.0, contain terminal 1,2-epoxy groups, and have alternate aliphatic and aromatic nuclei linked together by ethereal oxygen atoms.

The nature of the glycidyl polyethers from dihydric phenols can be better understood by considering preparation of a product which we prefer to use in our invention. In the example, the parts are by weight.

EXAMPLE I

A solution consisting of 11.7 parts of water, 1.22 parts of sodium hydroxide, and 13.38 parts of bis-phenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water at 20 to 30° C. temperature was started 30 minutes later and continued for 4½ hours. The product was dried by heating to a final temperature of 140° C. in 80 minutes, and cooled rapidly. At room temperature, the product was an extremely viscous, semi-solid having a softening point of 27° C. by Durrans' Mercury Method, a molecular weight measured ebullioscopically in ethylene dichloride of 469, and an epoxide value of 0.40 equivalent per 100 grams. This product will be referred to hereinafter for convenience as Resin A.

In like manner, other glycidyl polyethers contained in the compositions can be prepared whose properties vary with the particular dihydric phenol employed and the mol ratio of epichlorhydrin to phenol used in their preparation. For example, the variation in properties with different mol ratios of epichlorhydrin to bisphenol are shown in Table I below.

Table I

| Mol Ratio of Epichlorhydrin to Bis-Phenol | Softening Point | Mol Wt. | Epoxy Value, eq./100 g. | 1,2-Epoxy Equivalency |
|---|---|---|---|---|
| | °C. | | | |
| 2.6 (Resin A) | 27 | 469 | 0.40 | 1.9 |
| 2.04 | 53 | 710 | 0.27 | 1.9 |
| 1.57 | 77 | 900 | 0.20 | 1.8 |
| 1.22 | 98 | 1,400 | 0.10 | 1.5 |

Glycidyl polyethers of higher molecular weight and softening point are best prepared by reacting a lower polyether with less than an equimolecular amount of dihydric phenol. Thus upon heating the above-noted product which has a softening point of 98° C. to a temperature of about 150° C. and then adding 5% by weight of bisphenol after which the temperature is gradually increased to 190° C. in about 30 minutes followed by maintaining the temperature at this point for an additional 1½ hours, there is obtained a glycidyl polyether having a softening point of 131° C., an epoxy value of 0.05 equivalent of epoxy per 100 grams, and a molecular weight of 2900.

The other essential ingredient in the compositions of the invention is a polyvinyl ester of a saturated fatty acid. While the acyl radicals therein can contain any number of carbon atoms, it is preferred to employ esters of acids of up to four carbon atoms. Polyvinyl acetate is most preferred, especially because of its commercial availability. Polyvinyl esters of various average degrees of polymerization are suitable, but in general, it is preferred that the polymer be compatible with the glycidyl polyether. Excellent results are obtainable with polyvinyl acetate having an average degree of polymerization such that the polymer has a ring and ball softening point of about 30° C. to 100° C., particularly of about 65° C. to 85° C. Polyvinyl esters of other saturated fatty acids having degrees of polymerization within the range of about 50 to 1000 are also very suitable. In all cases, the polymers employed are thermoplastic.

It is convenient to use polyvinyl ester in the form of granules or powder as distinguished from blocks or chunks of the resin. The preferred form facilitates incorporation of the polyvinyl ester with the glycidyl polyether. For example, a quantity of the glycidyl polyether of bis-phenol having a Durrans' Mercury Method softening point of about 98° C. described hereinbefore is heated to about 150° C. To the molten polyether, there is introduced with stirring an added 10% of polyvinyl acetate having a ring and ball softening point of about 32° C. (Vinylite AYAC) which is in the form of fine granules. The mixture soon fuses to a homogeneous mass. Upon addition thereto of an added 10% of phthalic anhydride as hardening agent and continuing the heating at about 150° C. for an hour, the composition cures to a hard resin.

Various optional ingredients can be incorporated with the compositions of the invention. Their choice and amount is largely governed by the particular use to which the compositions are put. In using the compositions for adhesive purposes, it is convenient to have the mixture spreadably fluid at room temperatures (20–25° C.) in order that the material may be applied as well as cured without application of heat. This is accomplished by incorporating with the composition containing the glycidyl polyether and the polyvinyl ester, a fluidizing amount of a normally liquid solvent, which solvent remains in the cured composition. For this purpose, reactive diluents are very suitable such as normally liquid mono-epoxy compounds. The mono-epoxy compound used as a reactive diluent in the compositions contains but a single epoxy group, is a liquid at ordinary temperature, and has a low viscosity such as less than 5 poises at 25° C. These are the only essential limitations on the suitability of any particular mono-epoxy compound although it is preferred that the compound be devoid of any other group reactive with glycidyl ethers. In being a mono-epoxy compound, customary usage of the word epoxy is employed, namely, that the compound contains a structure in which an oxygen atom has the two bonds thereof linked to different saturated carbon atoms which are vicinal carbon atoms in being linked directly together. The compounds thus contain the group

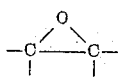

The epoxy group may either be in terminal location or be an interior group. Among representative compounds suitable for incorporation in the compositions are propylene oxide, butylene oxide, isobutylene oxide, butadiene monoxide, 1,2-pentylene oxide, 2,3-hexylene oxide, 3,4-hexylene oxide, 3-ethyl-2,3-pentylene oxide, epichlorhydrin, epibromhydrin, octylene oxide, styrene oxide, glycidol, decylene oxide and the like. It is preferred to use a mono-epoxy compound which is substantially non-volatile at ordinary temperature such as is the case with those having a boiling point above 100° C. at normal atmospheric pressure. Among the members of this preferred class of mono-epoxy compounds are the monoglycidyl ethers including methyl, ethyl, isopropyl, allyl, crotyl, isoamyl, phenyl, o-tolyl, p-tolyl, thymyl, and naphthyl glycidyl ethers.

Another fluidizing diluent employed in the compositions of the invention is a cyano-substituted hydrocarbon. They are normally liquid in having a melting point below 10° C. and contain one or more nitrile groups linked to the hydrocarbon radical which may be of any type desired, saturated or unsaturated; aliphatic, alicyclic or aromatic. Although it has been found that acetonitrile or methyl cyanide is a particularly preferred member, examples of other non-limiting compounds include propionitrile, butyronitrile, capronitrile, lauronitrile, acrylonitrile, methacrylonitrile, crotonitrile, oleonitrile, 2-cyano-1,3-butadiene, succinonitrile, glutaronitrile, adiponitrile, fumaronitrile, allylmalononitrile, cyclopentyl cyanide, cyclohexyl cyanide, 1,2-dicyanocyclohexane, benzonitrile, and phenylacetonitrile. In general, it is preferred to employ a cyano-substituted saturated hydrocarbon containing one to two cyanide groups, which compound contains 2 to 8 carbon atoms. Good results are obtained with alkyl cyanides containing up to 4 carbon atoms, although higher members of this class containing up to 12 carbon atoms and having melting points below 10° C. may be used, if desired.

The compositions may also contain one or more comminuted inorganic fillers such as asbestos, aluminum oxide, silica, bauxite, zinc oxide, china clay, titanium oxide, silicon carbide and the like.

Some examples of the compositions and their use will illustrate the invention, the parts in the examples being by weight.

EXAMPLE II

An adhesive composition was prepared from 88 parts Resin A, 12 parts acetonitrile, 4 parts polyvinyl acetate having a ring and ball softening point of about 77° C. (Vinylite AYAF), and 75 parts of powdered asbestos fiber. The composition was compounded by dissolving the polyvinyl acetate in the acetonitrile, adding the resulting solution to the glycidyl polyether, then introducing the asbestos, and finally mixing until the composition was smooth and uniform. There were next added 10 parts of di-n-butylamine as hardening agent.

The adhesive properties were tested with aluminum blocks of about one-quarter inch thickness cleaned by wiping with a cloth soaked with carbon tetrachloride. The freshly prepared adhesive mixtures were spread on a one inch square surface of each of two blocks with the aid of a doctor blade having a clearance of 0.005 inch. The coated surfaces of the two blocks were then united and the joined blocks placed in a constant temperature oven set at 95° F. Glued blocks were removed from the constant temperature oven after 6 days' time and subjected to the block shear test of the Army-Navy-Civil Committee on Aircraft Design Criteria: "Wood Aircraft Inspection and Fabrication," ANC-19 (Dec. 20, 1943), discussed in an article by R. C. Rinker and G. M. Kline, Modern Plastics, vol. 23, p. 164, 1945. The shear strength with the blocks at 77° F. was found to be 2350 p. s. i. (pounds per square inch) and even when measured at 105° C. the shear strength was 1265 p. s. i.

Since as noted before, the strength against shock or impact strength is of prime importance for adhesively united articles, the Izod impact strength was determined using aluminum blocks according to ASTM method D-950-47T. The adhesive composition was applied to the blocks as described above and they were cured at 95° F. for 6 days. It was found that the impact strength was greater than the limits of the testing machine and amounted to more than 15 foot-pounds per square inch.

EXAMPLE III

Another composition was similarly prepared from 85 parts Resin A, 15 parts allyl glycidyl ether, 4 parts polyvinyl acetate (Vinylite AYAF) and 75 parts powdered asbestos fiber. As hardening agent, 10 parts of di-n-butylamine were added. The composition containing the hardening agent was applied and tested as described above. After curing for 6 days at 95° C., the shear strength at 77° F. was 3390 p. s. i. and the Izod impact strength was 12.4 foot-pounds per square inch.

In some cases, it is desirable to include another optional component in the compositions of the invention. This component is a glycidyl polyether of a polyhydric alcohol and contains a plurality of glycidyl groups. These include such polyglycidyl ethers as diglycidyl ethers of ethylene glycol, propylene glycol, trimethylene glycol, butylene glycol, diethylene glycol, triethylene glycol, glycerol, tripropylene glycol, and the like as well as ethers containing more than two glycidyl groups such as the polyglycidyl ethers of glycerol, diglycerol, erythritol, pentaglycerol, pentaerythritol, mannitol, sorbitol, polyallyl alcohol, polyvinyl alcohol and the like. Such glycidyl ethers also have a 1,2-epoxy value greater than 1.0.

The polyglycidyl polyethers of the polyhydric alcohols are prepared by reacting the polyhydric alcohol with epichlorohydrin in the presence of 0.1 to 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mole of epichlorhydrin for each molecular equivalent of hydroxyl group in the polyhydric alcohol. Thus, in preparing the ether of diethylene glycol, which glycol contains two hydroxyl groups in each molecule thereof, about two mols of epichlorhydrin for each mol of diethylene glycol are used. The resulting chlorhydrin ether from the reaction of a polyhydric alcohol with epichlorhydrin is dehydrochlorinated by heating at about 50° C. to 125° C. with a small, say 10% stoichiometrical excess of a base. For this purpose, sodium aluminate gives good results.

Preparation of the polyglycidyl ethers of polyhydric alcohols may be illustrated by considering application of the above method to preparation of the polyglycidyl ether of glycerol.

EXAMPLE IV

In parts by weight, about 276 parts of glycerol (3 mols) were mixed with 828 parts of epichlorhydrin (9 mols). To this reaction mixture were added 10 parts of a diethyl ether solution containing about 4.5% of boron trifluoride. The temperature rose as a result of the exothermic reaction and external cooling with ice water was applied so as to keep the temperature between about 50° C. and 75° C. during a reaction period of about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, an amount of 261 parts, was a pale yellow, viscous liquid. It had an epoxide value of 0.671 equivalent per 100 grams and the molecular weight was 324 as measured ebullioscopically in a dioxane solution. These values showed that the polyglycidyl ether had a 1,2-epoxy equivalency of 2.18—i. e., an average of about 2.2 epoxide groups per molecule. For convenience, this product will be known as Resin B.

As explained above, the polyvinyl ester is present in minor proportion in the composition containing the glycidyl polyether of a dihydric phenol. Based on the weight of the glycidyl polyether, there is thus used up to less than an added 100% of the polyvinyl ester although it is more usual to employ an added 1 to 25%, and best results appear with an added 1 to 10%. The proportion of optional ingredients in the compositions may also be varied considerably. The glycidyl polyether is used in admixture with about an added 5 to 20% of fluidizing diluent, i. e., the liquid mono-epoxy compound or cyano-substituted hydrocarbon. The polyglycidyl ether of the polyhydric alcohol is present in amount of about an added 10 to 40%. The comminuted inorganic filler is employed in amount of about an added 50 to 125%. All of the noted percentages are, of course, based upon and in relation to the weight of the glycidyl polyether of the dihydric phenol contained in the composition.

In using the compositions of the invention, a hardening agent is incorporated therewith. Upon the addition of the hardening agent, the composition begins to cure and harden even at ordinary temperature. A great variety of substances are now known to be hardening agents for the resin-forming ingredients of the composition such as alkalies like sodium or potassium hydroxide; alkali phenoxides like sodium phenoxides; carboxylic acids or anhydrides such as formic acid, oxalic acid or phthalic anhydride; Friedel-Crafts metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, pyridine, piperidine, dicyandiamide, melamine and the like. The hardening agent is added and mixed in with the composition in order to effect hardening. The amounts vary considerably depending upon the particular agent employed. For the alkalies or phenoxides, 2 to 4 per cent is suitable. With phosphoric acid and esters thereof, good results are obtained with 1 to 10 per cent added. The amino compounds are used in amounts of about 5 to 15 per cent and the others involve addition of about 1 to 20 per cent.

In applying the composition for adhesive purposes, the composition containing the glycidyl polyether of the polyhydric phenol and the polyvinyl ester has added thereto sufficient hardening agent and the mixture is applied as by spreading upon a surface desired to be united to another surface at a thickness of about 0.0005 to 0.1 inch thickness. The adhesive mixture is suitable for uniting various surfaces such as wood to wood, wood to metal, metal to metal, resin to resin, or any combination thereof. After application and joinder of the surfaces desired to be united, the adhered articles are allowed to cure for a period of from about 30 minutes to a day or more, depending upon the hardening agent and temperature employed. In this time when heating is omitted, the adhesive composition will set up to a solid which will permit ordinary handling thereof. Maximum strength for the adhesive layer will be reached within one day to two weeks. While the application is effected at ordinary atmospheric temperature and the curing may also be permitted to occur at such temperatures, the curing may be effected in shorter times at elevated temperatures such as up to 75° C., 100° C., 150° C. or even higher in some cases. In cases where elevated curing temperature is employed, the chosen temperature is below the boiling temperature of the lowest boiling constituent contained in the mixture, and preferably, it is at least 20° C. below such boiling temperature.

A better understanding of the nature of the invention and its advantages will be attained by considering some particular applications and comparisons thereof. The parts are by weight in the following examples.

EXAMPLE V

A composition was prepared by mixing together 75 parts of Resin A (glycidyl polyether of bisphenol), 25 parts of Resin B (polyglycidyl ether of glycerol), 10 parts of allyl glycidyl ether, and 100 parts of powdered bauxite (natural alumina containing about 17.5% iron oxide). Another composition of like amounts and kinds of ingredients was prepared which also contained 5 parts of polyvinyl acetate having a ring and ball softening point of about 77° C. (Vinylite AYAF). Each composition was a viscous, but spreadably fluid mixture.

About 8 parts of diethylene triamine were added to and mixed with each composition. The two compositions were then tested as adhesives for joining aluminum to aluminum. They were applied to aluminum blocks as described in Example II, and after curing for 6 days at 77° F., the blocks were tested for shear and impact strength. The results are given in the following table.

| Containing Polyvinyl Acetate | yes | no |
|---|---|---|
| Impact strength, ft.-lbs./sq. in | 14.5 | 1.0 |
| Shear Strength (p. s. i.) at: | | |
| 25° C | 3,050 | 2,070 |
| 75° C | 3,140 | 720 |
| 90° C | 1,750 | 350 |

The foregoing results demonstrate the unusual superiority of the composition of the invention. Not only is very high impact strength realized, but also, the shear strength is much better and the shear strengths at elevated temperatures remain very high. The latter is a property seldom, if ever, realized with prior adhesives.

EXAMPLE VI

Three compositions were prepared containing 2, 4 and 6 parts, respectively, of polyvinyl acetate having a ring and ball softening point of 77° C. (Vinylite AYAF) in admixture with 75 parts of Resin A, 25 parts of Resin B, and 8 parts of acetonitrile. As hardening agent, 10 parts of di-n-butyl amine were added. The compositions were tested as adhesives for bonding aluminum to aluminum as described in Example II, the cure being effected at 130° F. for 6 days' time. The results of tests for determination of the impact and shear strengths at 77° F. are tabulated below. In order that the machine would be capable of measuring the high impact strength, the area of adherence was reduced to one-half square inch.

| Parts of Polyvinyl Acetate | Impact Strength, ft.-lbs./sq. in. | Shear Strength, p. s. i. |
|---|---|---|
| 2 | 13.9 | 5,350 |
| 4 | 17.3 | 4,610 |
| 6 | 27.7 | 3,080 |

The unique performance of the polyvinyl esters of saturated fatty acids in the compositions of the invention will be evident upon comparison of the above results with those obtained with similar compositions containing other vinyl resins. A base mixture of 75 parts of Resin A, 25 parts of Resin B, and 10 parts of allyl glycidyl ether was prepared. Incorporation of 10 parts of the copolymer of vinyl chloride and vinyl acetate containing 85–88% of the former (Vinylite VYHH) resulted in the mixture gelling so as to be useless for adhesive purposes. Incorporation of 10 parts of polyvinyl methyl ether with the base mixture gave a spreadably fluid composition, as did also use of 10 parts of a copolymer of vinylidene chloride (Saran F). These two compositions had 12.5 parts triethylamine as hardening agent mixed therewith and were then tested as adhesives using a cure of 6 days at 77° F. Except for the different vinyl resins present, the compositions, their cure and performance should be substantially the same as the compositions of the invention containing a polyvinyl ester of a saturated fatty acid. It was found, however, that in bonding aluminum to aluminum, the composition containing the polyvinyl methyl ether gave an impact strength of only 1.3 ft.-lbs./sq. in. and a shear strength of 1650 p. s. i., while the composition containing the vinylidene chloride polymer gave an impact strength of 0.8 ft.-lbs./sq. in. and a shear strength of 1055 p. s. i.

EXAMPLE VII

Preferred compositions were prepared containing 2, 4 and 6 parts, respectively, of polyvinyl acetate having a ring and ball softening point of 77° C. (Vinylite AYAF) in admixture with 75 parts of Resin A, 25 parts of Resin B, 8 parts of acetonitrile, and 75 parts of granular asbestos fiber. Ten parts of di-n-butylamine were added to the fluid compositions, and the mixtures were then tested as adhesives for bonding aluminum to aluminum as described in Example II. The impact and shear strengths after curing at 130° F. for 6 days are tabulated below.

| Parts of Polyvinyl Acetate | 2 | 4 | 6 |
|---|---|---|---|
| Impact Strength, ft.-lbs./sq. in. | 27.0 | 27.5 | >30 |
| Shear Strength (p. s. i.) at: | | | |
| 25° C | 3,975 | 2,670 | 2,225 |
| 90° C | 2,890 | 2,845 | 2,720 |
| 105° C | 2,740 | 2,025 | 2,930 |

We claim as our invention:
1. A composition comprising a glycidyl polyether of a dihydric phenol having a 1,2-epoxy equivalency greater than 1.0 in admixture with a minor proportion of polyvinyl ester of a saturated fatty acid.

2. A composition comprising a glycidyl polyether of 2,2-bis(4-hydroxyphenyl)propane having a 1,2-epoxy equivalency between 1.0 and 2.0 in admixture with a minor proportion of polyvinyl acetate.

3. A composition comprising a glycidyl polyether of 2,2-bis(4-hydroxyphenyl)propane having a 1,2-epoxy equivalency between 1.0 and 2.0 in admixture with 1 to 25% of polyvinyl acetate having a ring and ball softening point of about 65° C. to 85° C.

4. A composition comprising a glycidyl polyether of a dihydric phenol having a 1,2-epoxy equivalency greater than 1.0 in admixture with an added 5 to 20% of a liquid mono-epoxy compound and an added 1 to 10% of polyvinyl acetate.

5. A composition comprising a glycidyl polyether of a dihydric phenol having a 1,2-epoxy equivalency greater than 1.0 in admixture with an added 5 to 20% of a liquid cyano-substituted hydrocarbon and an added 1 to 10% of polyvinyl acetate.

6. A composition comprising a glycidyl polyether of 2,2-bis(4-hydroxyphenyl)propane having a 1,2-epoxy equivalency between 1.0 and 2.0 in admixture with an added 5 to 20% of a liquid mono-epoxy compound, an added 50 to 125% of comminuted inorganic filler, and an added 1 to 10% of polyvinyl acetate.

7. A composition comprising a glycidyl polyether of 2,2-bis(4-hydroxyphenyl)propane having a 1,2-epoxy equivalency between 1.0 and 2.0 in admixture with an added 5 to 20% of a liquid cyano-substituted hydrocarbon, an added 50 to 125% of comminuted inorganic filler, and an added 1 to 10% of polyvinyl acetate.

8. A composition comprising a glycidyl polyether of a dihydric phenol having a 1,2-epoxy equivalency greater than 1.0 in admixture with an added 10 to 40% of a polyglycidyl ether of a polyhydric alcohol, an added 5 to 20% of allyl glycidyl ether, an added 50 to 125% of comminuted inorganic filler, and an added 1 to 10% of polyvinyl acetate having a ring and ball softening point of about 65° C. to 85° C.

9. A composition comprising a glycidyl polyether of a dihydric phenol having a 1,2-epoxy equivalency greater than 1.0 in admixture with an added 10 to 40% of a polyglycidyl ether of a polyhydric alcohol, an added 5 to 20% of acetonitrile, an added 50 to 125% of comminuted inorganic filler, and an added 1 to 10% of polyvinyl acetate having a ring and ball softening point of about 65° C. to 85° C.

10. A composition comprising in admixture by weight: about 75 parts of glycidyl polyether of 2,2-bis(4-hydroxyphenyl)propane having a 1,2- epoxy equivalency of about 1.9 and a Durrans' Mercury Method softening point of about 27° C., about 25 parts of polyglycidyl ether of glycerol, about 8 parts of acetonitrile, about 75 parts of granular asbestos fiber, and about 2 to 6 parts of polyvinyl acetate having a ring and ball softening point of about 77° C.

11. A composition comprising glycidyl polyether of 2,2-bis(4-hydroxyphenyl)propane having a 1,2-epoxy equivalency of about 1.9 and a Durrans' Mercury Method softening point of about 27° C., in admixture with about an added 5 to 20% of allyl glycidyl ether, and about an added 1 to 10% of polyvinyl acetate having a ring and ball softening point of about 65° C. to 85° C.

QUENTIN T. WILES.
DANIEL W. ELAM.

REFERENCES CITED

The following references are of record in the file of this patent:

UNITED STATES PATENTS

| Number | Name | Date |
|---|---|---|
| 2,474,292 | Weidner | June 28, 1949 |
| 2,512,996 | Bixler | June 27, 1950 |

FOREIGN PATENTS

| Number | Country | Date |
|---|---|---|
| 574,459 | Great Britain | Jan. 7, 1945 |
| 597,144 | Great Britain | Jan. 19, 1948 |